Oct. 4, 1955     C. A. MENDENHALL     2,719,433
POWER TAKE-OFF FOR MECHANICAL WINDSHIELD WIPER
Filed Dec. 4, 1952
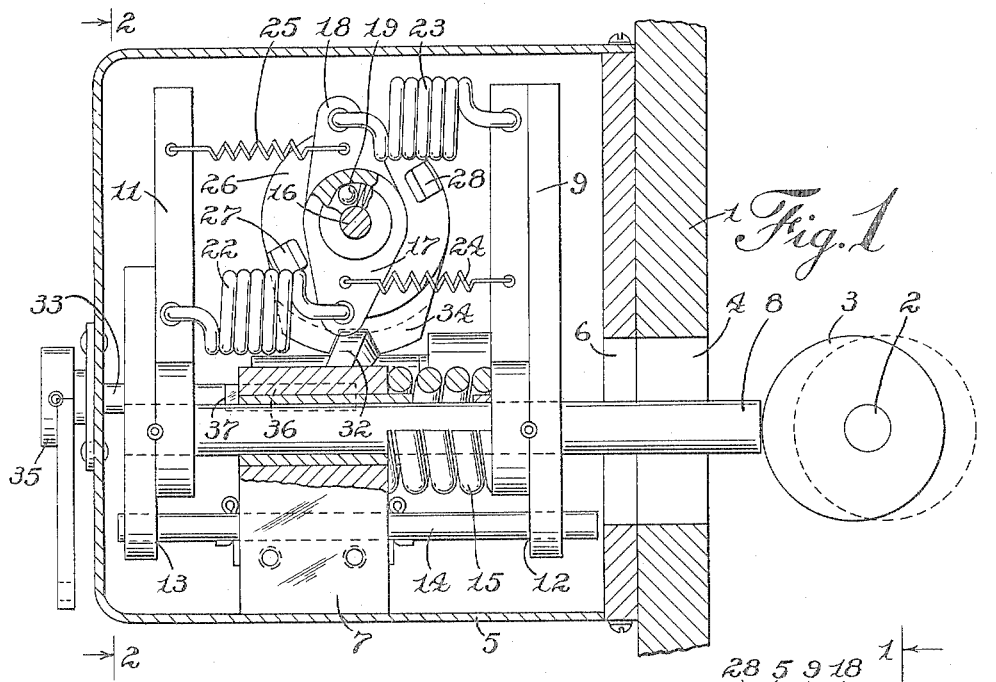
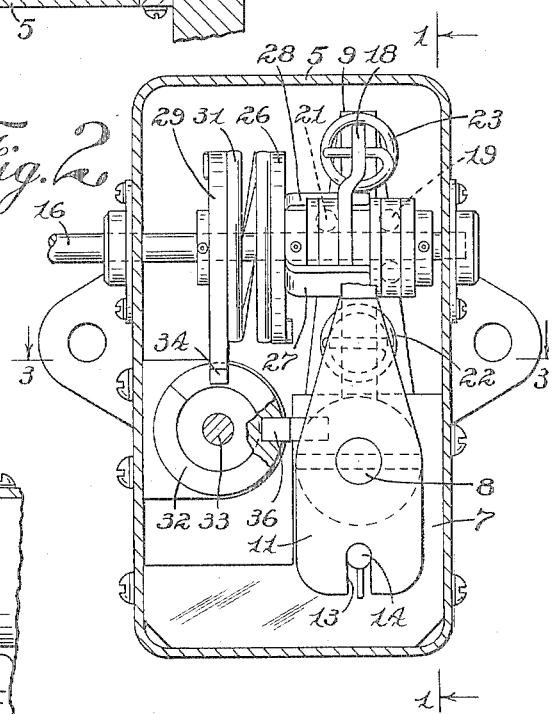
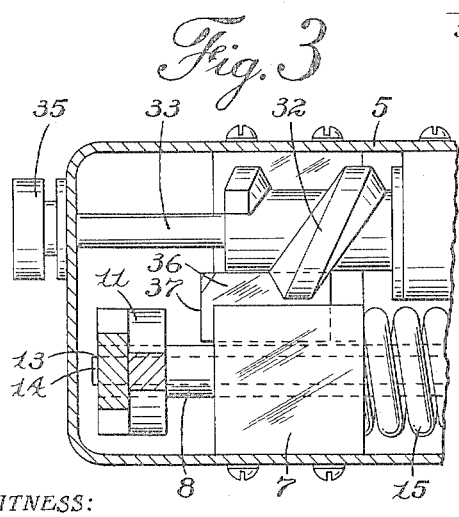
WITNESS:
Esther M. Stockton
INVENTOR.
Charles A. Mendenhall
BY
Clinton L. Janes
ATTORNEY

United States Patent Office 2,719,433
Patented Oct. 4, 1955

2,719,433

POWER TAKE-OFF FOR MECHANICAL WINDSHIELD WIPER

Charles A. Mendenhall, Elmira, N. Y., assignor to Bendix Aviation Corporation, a corporation of Delaware Application December 4, 1952, Serial No. 324,037

2 Claims. (Cl. 74—124)

The present invention relates to an engine driven power take-off for mechanical windshield wipers, and more particularly to a transmission for rotating a windshield wiper shaft at any desired speed, irrespective of the coincident speed of the engine.

It is an object of the present invention to provide a novel device of this character which is simple in construction, effective in operation and capable of long useful life without deterioration.

It is another object to provide such a device which is free from frictional slip connections or other speed limiting devices involving waste of useful energy and generation of heat.

It is another object to provide such a device in which none of the parts of the power take-off are in motion when the device is not in use.

Further objects and advantages will be apparent from the following description taken in connection with the accompanying drawing, in which:

Fig. 1 is a side elevation of a device with the side of the casing removed and certain parts broken away for the sake of clarity and shown in section substantially on the line 1—1 of Fig. 2;

Fig. 2 is a section taken substantially on the line 2—2 of Fig. 1; and

Fig. 3 is a sectional detail taken substantially on the line 3—3 of Fig. 2 showing the means for rendering the device inoperative when not required.

In Fig. 1 of the drawing there is illustrated a portion of the crankcase 1 of an internal combustion engine in which a cam shaft 2 is rotatably mounted in any suitable manner. Shaft 2 has mounted thereon or formed integrally therewith a cam 3 which is located opposite an opening 4 in the side of the crankcase.

A transmission housing 5 having an opening 6 is suitably attached to the crankcase 1 with the openings 4 and 6 in registry, and has a bearing support 7 fixedly mounted therein and supporting a slidable plunger 8 which extends through the openings 6, 4 in position to bear at its end on the cam 3. Upwardly extending arms 9 and 11 are rigidly mounted on the plunger 8, and are provided with openings 12, 13, respectively, which slidably receive a stationary bearing rod 14 forming a guide for said arms.

Means for normally pressing the end of the plunger 8 against the cam 3 is provided in the form of a spring 15 located between the arm 9 and the adjacent side of the bearing support 7 whereby rotation of the cam 3 causes reciprocation of the plunger.

A driven shaft 16 is rotatably mounted in the transmission housing 5 transverse to the plunger 8, and extends from the housing to form a source of power for a windshield wiper which is not illustrated, since it forms no part of the present invention.

Means for rotating the driven shaft 16 by means of the reciprocating movement of the plunger 8 is provided comprising a pair of clutch levers 17, 18 which are rotatably mounted on the driven shaft 16 and are each provided with a one-way driving connection comprising a ball clutch 19, 21, respectively. The lever 17 is connected to the plunger arm 11 by an actuating spring 22, while the clutch lever 18 is similarly connected by a spring 23 to the plunger arm 9; and the overrunning clutches 19, 21 are so arranged that when the clutch levers are actuated by their respective spring transmission members 22 or 23, the rotary movement of the clutch lever is transmitted to the driven shaft to rotate it in a clockwise direction as viewed in Fig. 1. The rotary levers 17, 18 are preferably drawn back to their original positions during their idle strokes by means of light springs 24, 25 which are attached to the plunger arms 9, 11 oppositely to the transmission springs 22, 23.

In order to control the speed of rotation of the driven shaft 16, means are provided for adjustably limiting the strokes of the clutch levers 17, 18. As best seen in Fig. 2, this means comprises a disc 26 rotatably mounted on the driven shaft 16 and having arms 27, 28 extending longitudinally into the plane of movement of the levers. A second disc 29 is journaled on the driven shaft 16 and is connected to the control disc 26 by means of a heavy torsion spring 31. Means for angularly adjusting the disc 29 is provided comprising a worm 32 mounted on a shaft 33 journaled in the transmission housing 5 and meshing with a worm wheel sector 34 formed on the disc 29. Shaft 33 extends from housing 5 for reception of an adjusting means 35 which is preferably actuated by a suitable flexible cable mechanism from the dash of the vehicle on which the device is mounted.

Means are provided for holding the plunger 8 out of contact with the cam 3 when it is not desired to use the windshield wiper. For this purpose a rack member 36 having teeth meshing with the teeth of the worm 32 is slidably mounted in the bearing support 7 and is provided at its end with an abutment surface 37 (Fig. 3) which is movable into engagement with the side of the arm 11 to hold the plunger 8 in retracted position.

In Figs. 1 and 3 of the drawing the transmission is illustrated in the high speed position with the arms 27, 28 of the control disc 26 spaced from the transmission levers 17, 18 so as to permit said levers to perform their full stroke as actuated by the arms 9, 11 of plunger 8. Rotation of the control disc 26 in a counterclockwise direction as viewed in Fig. 1 will bring the arms 27, 28 into the path of movement of the levers 17, 18 and curtail their arc of movement, thereby correspondingly reducing the speed of rotation of the driven shaft 16, the transmission springs 22, 23 being merely stretched and relaxed during those portions of the stroke of the plunger 8 during which the levers 17, 18 are prevented from further arcuate movement. In this manner, by rotation of the worm 32 in a clockwise direction, as viewed in Fig. 2, the speed of the driven shaft 16 and consequently of the windshield wiper driven thereby may be reduced to any desired extent.

Such clockwise rotation of the worm 32 will move the rack member 36 to the right as viewed in Fig. 3, sufficient clearance being provided to allow the desired adjustment of the control disc 26. When it is desired to render the device inoperative, the worm 32 is rotated in a counterclockwise direction as shown in Fig. 2 beyond the high speed position shown in Figs. 1 and 3 until the rack 36 is moved to the left sufficiently to engage the arm 11 and hold the plunger 8 out of contact with the cam 3.

Although but one embodiment of the invention has been shown and described in detail, it will be understood that other embodiments are possible and changes may be made in the design and arrangement of parts without departing from the spirit of the invention.

I claim:
1. In an engine-driven power take-off for windshield wipers a plunger, means including a cam operated by the engine for reciprocating the plunger, a driven shaft, a crank rotatably mounted on the shaft, an overrunning clutch connection between the crank and shaft, yielding means connecting the plunger to the crank to oscillate the crank responsive to reciprocation of the plunger, means comprising a disc adjustably mounted on the driven shaft having an abutment in the path of movement of the crank for limiting its arc of travel, and consequently controlling the speed of rotation of the driven shaft, manually operable means for adjusting the position of the disc, yielding means for urging the plunger into engagement with the cam, and means actuated by said manual means as it approaches one limit of its adjusting movement, operative to move the plunger out of contact with said cam.

2. A power take-off for windshield wipers as set forth in claim 1 in which the adjusting disc is formed with a sector of a worm wheel, and the manual adjusting means comprises a worm meshing with said sector, and in which the means for moving the plunger out of contact with the cam comprises an abutment member on the plunger and a rack meshing with said worm and slidable thereby into engagement with said abutment.

References Cited in the file of this patent

UNITED STATES PATENTS

| | | |
|---|---|---|
| 1,035,604 | Kissel | Aug. 13, 1912 |
| 1,313,764 | Thurston | Aug. 19, 1919 |
| 2,087,562 | Wallace | July 20, 1937 |
| 2,176,381 | Shaw | Oct. 17, 1939 |
| 2,308,974 | Harper | Jan. 19, 1943 |
| 2,588,560 | Nicolls | Mar. 11, 1952 |

FOREIGN PATENTS

| | | |
|---|---|---|
| 498,254 | Germany | May 20, 1930 |